Nov. 22, 1927.  
C. F. KETTERING  
ELECTRICAL APPARATUS  
Filed Sept. 23, 1922  
1,650,524
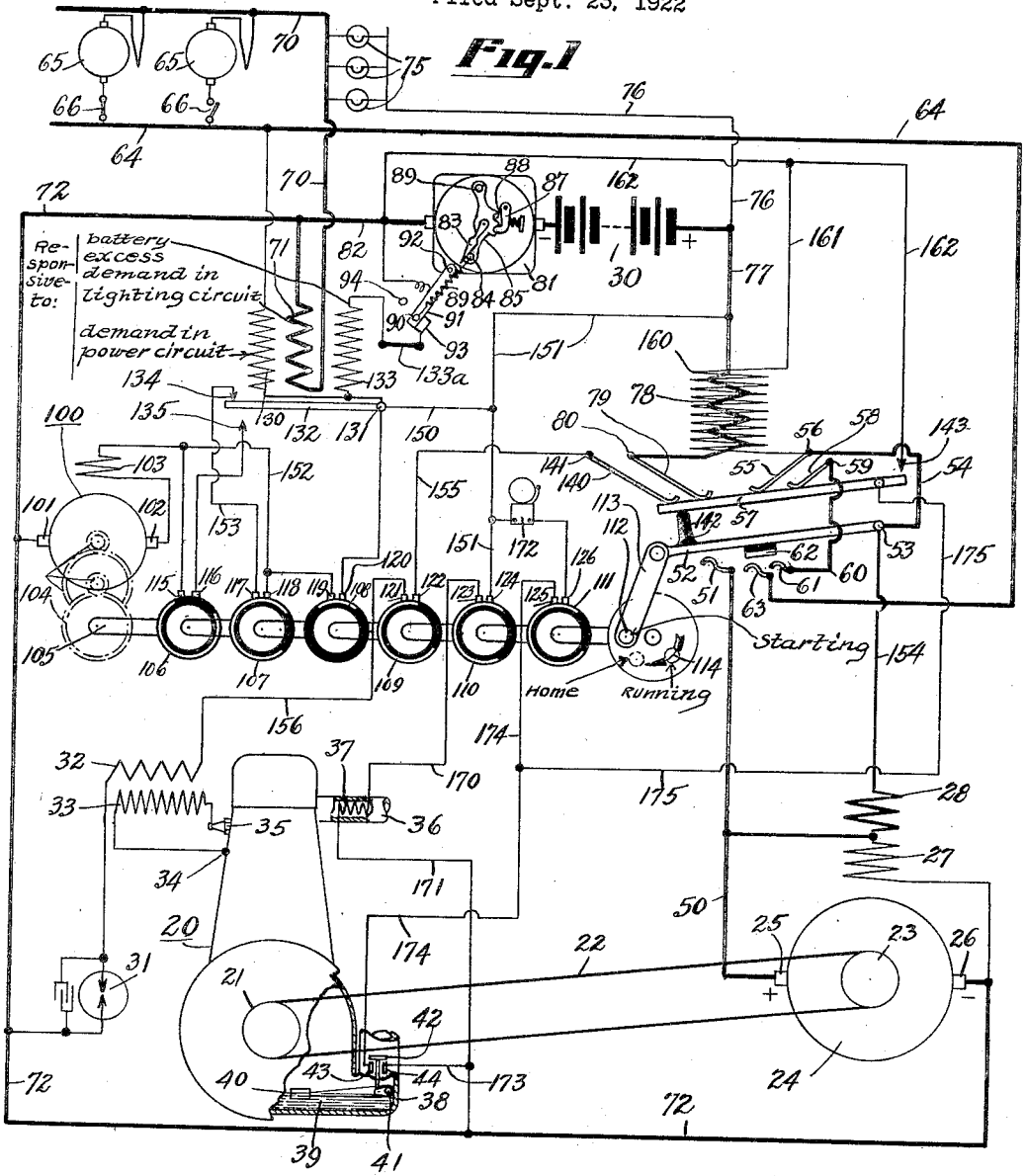
Fig.1
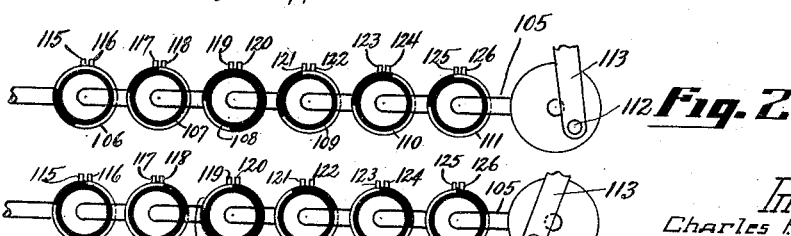
Fig.2
Fig.3
Witnesses  
Warren Schmieding  
Geo. H. Wallace  
Inventor  
Charles F. Kettering  
By J. Ralph Fehr  
his Attorney Patented Nov. 22, 1927.

1,650,524

UNITED STATES PATENT OFFICE.

CHARLES F. KETTERING, OF DAYTON, OHIO, ASSIGNOR TO DELCO-LIGHT COMPANY, OF DAYTON, OHIO, A CORPORATION OF DELAWARE.

ELECTRICAL APPARATUS.

Application filed September 23, 1922. Serial No. 589,393.

This invention relates to plants for generating electricity for power and lighting and other purposes, and to the type of plant wherein starting and stopping of the plant is controlled automatically.

One object of the present invention is to provide an electrical power plant including a dynamo which will start automatically when there is a demand for current, but in which the dynamo is not connected electrically to supply the demand until sufficient generating speed has been attained.

A further object is to provide an electrical power plant for supplying current to translation devices each requiring relatively large amounts of current and to other devices each requiring small amounts of current, and in which the power plant will start automatically whenever there is a demand by any of the first mentioned devices, but will not start automatically until the total demands by the second mentioned devices exceeds a certain amount.

In carrying out this aim of the invention, a further object is to provide an electrical generating system including two work circuits, namely a power circuit including the translation devices each requiring relatively large amounts of current, and a lighting circuit including electric lamps and small fan motors and the like each requiring relatively small amounts for current. The generating plant is so controlled automatically that any demand in the power circuit will cause the plant to start, but the plant will not start automatically until the demand in the lighting circuit exceeds a certain amount. Smaller demands of the lighting circuit are supplied preferably by a storage battery included in the system. It is to be understood that the terms "power circuit" and "lighting circuit" are used arbitrarily to apply to circuits including large demand translation devices and small demand translation devices, respectively, but that lights may be placed in the power circuit, and power devices in the lighting circuit if desired.

A further object of the invention is to provide means for automatically stopping the plant and for electrically disconnecting the dynamo when the demand for current in the power circuit ceases, and the demand in lighting circuit is below a certain amount. No matter which work circuit demand has caused the starting of the plant, the plant will not stop until the demand in the power circuit ceases and the demand in the lighting circuit falls below a certain amount.

Where a plant of the character described includes an internal-combustion engine, a dynamo and a storage battery charged by the dynamo for supplying current to the dynamo to operate the same as a motor to crank the engine, and for supplying certain demands for current in the lighting circuit, it is a further object of the invention so to control the starting and stopping of the plant that the storage battery will not fall below a certain state of battery charge required to insure engine starting.

A further object is to provide an audible signal for indicating that the plant has failed to start for any reason, and which will indicate the lack of lubricating oil in the prime mover either during the starting of the prime mover or any time during the operation of the generating plant.

Other and further objects and advantages of the present invention are apparent from the following description of a preferred embodiment thereof, reference being made to the accompanying drawings:

In the drawings:

Fig. 1 is a wiring diagram of the invention, the automatic control mechanism being shown in the starting position;

Fig. 2 illustrates diagrammatically a fragment of the automatic control in the plant generating position; and Fig. 3 is a view similar to Fig. 2, the control elements having completed their cycle of operations and having returned to home position after having functioned to stop the plant.

*Engine and dynamo.*

Referring to the drawings, an internal-combustion engine 20 is connected by means of pulley 21, belt 22, and pulley 23 with a dynamo-electric machine 24 having an armature which is connected with brushes 25 and 26 and having a shunt winding 27 connected between said brushes 25 and 26, and having a series field winding 28. While the belt and pulley connections are illustrated, it is understood that other forms of connections may be used, and preferably the engine is directly connected to the dynamo as illustrated in the patent to Kettering and Chryst, No. 1,341,327, dated May 25, 1920. Ignition for the engine is provided from a storage battery 30 which has connections to be described with an ignition timer 31 and with an ignition coil having a primary 32 and a secondary 33. Secondary 33 is grounded at 34 and is connected with engine spark plug 35. The engine is provided with a fuel intake 36 which is arranged to be heated by means of an electrical heating coil 37. The crank case 38 of the engine is arranged to contain a quantity of lubricant indicated at 39, and should the level of the lubricant fall below a certain point the float lever 40 pivoted at 41 will cause the movable contact 42 to engage contacts 43 and 44 for the purpose of sounding an alarm as will be described.

Power and lamp circuits.

Preferably the current consuming devices are divided into two classes, namely, power devices meaning such devices as electric motors which would normally consume more than the current demand sufficient for causing the plant to be automatically started, and other devices such as lamps and fan motors which individually consume less than the current demand for causing the plant to operate. The first class of devices are preferably connected to what is called a power circuit, and the second class of devices are connected to a lighting circuit. The operation of any one of the devices of the power circuit will cause the plant to operate, whereas the operation of any one of the devices in the lamp circuit will not cause the plant to operate until the storage battery has discharged a certain amount. However, if a certain number of devices in the lighting circuit be operated at one time then the plant will automatically start.

The power circuit includes power line 50 beginning with the positive brush of the generator, switch contact 51, contact 52 which is pivoted at 53, wire 54, contact 55 pivoted at 56, conducting armature 57, contact 58, which is pivoted at 59, wire 60, contact 61, movable contact 62, contact 63, and wire 64. One or more power devices, such as electric motor 65 may be connected by switches 66 to the wire 64, and the other terminals of the motors are connected to the negative side of the power line which includes wire 70, relay winding 71, wire 72, which is connected to the negative brush 26 of the generator.

The lighting circuit includes a plurality of lamps or other small demand devices 75 which are connected to the battery positive terminal by wire 76, and battery negative terminal by wires 70, magnet winding 71, wire 82, and ampere hour meter 81. When the battery is being charged by the generator, the generator will also supply current to the devices 75.

Battery charging circuit.

This battery circuit includes storage battery 30, ampere hour meter 81, and wire 82 which connects the meter and battery with the negative wire 72 the battery being connected with the positive wire 77. Ampere hour meter 81 includes a hand 83 which moves in a clockwise direction when the battery is being charged and in a counter-clockwise direction during discharge. Hand 83, when in the position shown in Fig. 1, indicates a state of battery charge which corresponds, for example to a battery specific gravity of 1.185, and the movement of hand 83 into this position has caused it to engage a stud 84 carried by plate 85 thereby causing plate 85 to turn about the axis of rotation of hand 83 until the spring pressed pawl 87 engages the lower one (as view in Fig. 1) of the notches 88 with which the plate 85 is provided. Clockwise movement of hand 83 causes it to engage stud 89 carried by plate 85, and consequently, plate 85 will be moved until pawl 87 engages the upper one of the notches 88. This will occur for example when the battery charge is indicated by a specific gravity of 1.220. A spring 89 connects stud 84 with a stud 90 carried by contact 91 which is pivoted at 92. As shown in Fig. 1, contact 91 is held in engagement with a contact 93 since the line of action of spring 89 lies to the right of the pivot 92 and contact 91 will be separated from contact 93 and will move against a stop 94.

Automatic control of starting and generating.

The mechanism which operates to start the plant and to connect up the generating circuit in response to certain demands for power which have been described, will now be described in detail: A controller including motor 100 having an armature connected with brushes 101 and 102, and having a series field 103, is connected by suitable gearing 104 with a shaft 105 carrying a plurality of arcuate contacts 106, 107, 108, 109, 110, and 111 and a crank pin 112 connected by link 113 with the pivoted conductor 52 of a switching apparatus. The direction of rotation of the shaft 105 is clockwise as indicated by arrow 114 and the motor 100 and gearing 104 are so constructed that shaft 105 will make preferably one revolution per minute. Contacts 115 and 116 are connected by contact 106; contacts 117, 118, by contact 107; contacts 119, 120 by contact 108; contacts 121, 122 by contact 109; contacts 123, 124 by contact 110; and contacts 125, 126 by contact 111.

The relay or control mechanism for controlling the motor 100 of the controller includes the magnet winding 71, already mentioned, the magnet winding 130 which is connected to power circuit wire 64 and with the pivot point 131 of an armature of conducting material 132, and a third electro-magnet winding 133 which is also connected with pivot 131 and with the ampere hour meter contact 88. Each of the windings 71, 130, 133 is capable when energized in a manner to be described of causing the armature 132 to be attracted into the position shown in Fig. 1 wherein said armature 132 makes engagement with contact 134. Normally armature 132 is in engagement with contact 135. Each of the windings 130 and 133 have a relatively large number of turns of relatively fine wire for the reason that it is desired to keep the resistance high so that current consumption during the energizing of either of these windings will be relatively low. These windings respond to the act of closing certain circuits, the quantity of current carried not being important. However, winding 71 must carry the maximum current demanded by either the power line or the lighting circuit, and therefore must be relatively heavy. However, the ampere turns of this winding 71 must be sufficient to attract the armature 132 in case the current demand of the lighting circuit exceeds, for example, 300 watts.

*Operation of automatic control.*

At the start of the cycle of operations of the controller motor 100 the shaft 105 and parts carried thereby is in position shown in Fig. 3 wherein the only arcuate contact making an electrical circuit is the contact 107 bridging contacts 117 and 118. The crank 112 is in such position that the contact 52 of the switching apparatus will engage contact 51, and the contact 62 carried by contact 52 but insulated therefrom will engage contacts 61 and 63. When contact 52 is in this position the contact 57 of the switching apparatus will be out of engagement with contacts 55, 58, and 79, which have been described, and also out of engagement with a contact 140 which is pivoted at 141 and forms part of the ignition circuit. These contacts 55, 58, 79, and 140 are prevented from pivotal movement below their pivot points further than is shown in Fig. 1 but these contact members are free to move upwardly as viewed in Fig. 1. Instead of being pivoted members these contacts could be leaf spring members occupying positions shown in Fig. 1 when in unstressed condition and capable of being moved upwardly by the upward movement of contact 57. When the controller motor 100 is in home position contact 57 rests upon a nonconducting block 142 carried by contact 52, and contact 57 also engages contact 143.

Suppose it is desired to operate one of the motors 65. The motor switch 66 is closed whereupon the relay winding 71 and 130 will be connected in series with the battery through the following circuit: switch 66, wire 64, magnet coil 130, pivot point 131, wire 150, wire 151, wire 77, battery 30, ampere hour meter 81, wire 82, magnet coil 71, wire 70, to motor 65. While current will be then passing through motor 65 the current will be insufficient to operate this motor because of the high resistance of winding 130. However, sufficient current will be passing through winding 71 and winding 130 to produce the attraction of armature 132 into engagement with contact 134 whereupon the controller motor 100 will be connected with the battery 30 through the following circuit: battery 30, ampere hour meter 81, wire 82, wire 72, motor 100, wire 152, contacts 118, 107, 117, wire 153, contact 134, armature 132, pivot 131, wires 150, 151, and 77 leading to battery 30. The motor 100 will therefore be operated and will cause the shaft 105 to turn in a clockwise direction as indicated by arrow 114 in Fig. 1 and during the operation of the motor the parts carried by shaft 105 will move from the home position shown in Fig 3 to the position shown in Fig. 1. In Fig. 1 the contact 52 has been moved by shaft 105 acting through crank 112 and link 113, out of engagement with contact 51 and the contact 62 has moved out of engagement with contacts 61 and 63. This movement of contact 52 has caused the movement of contact 57 into engagement with contacts 58, 55, 79, and 140. This engagement will occur the instant the crank 112 arrives in the position shown in Fig. 1 there being a lapse of approximately seven and a half seconds from the start of the motor 100 before this contact is made.

When the controller is set up as shown in Fig. 1 the following cranking circuit will be established: battery 30, wire 77, relay winding 78, contact 79, contact 57, contact 55, wire 54, wire 154, dynamo series field 28, wire 50, brush 25, dynamo armature, brush 26, wire 72, wire 82, ampere hour meter 81, back to battery 30. The dynamo will now operate as a cumulative compound motor to crank the engine.

The engine ignition system includes the following circuit: battery 30, wire 77, relay series winding 78, contact 79, contact 57, contact 140, wire 155, contacts 122, 109, 121, wire 156, ignition coil primary 32, ignition timer 31, wire 72, wire 82, ampere hour meter 81, back to battery 30.

While current is flowing in the relay series winding 78 of the switching apparatus it is also flowing through a relay shunt winding 160 of said apparatus which shunt winding is connected across the battery terminals through the following circuit: battery 30, wire 77, series winding 78, contact 79, contact 57, contact 55, winding 160, wire 161, wire 162, wire 82, ampere hour meter 81, back to battery 30. Until the dynamo 24 starts to charge the battery the direction of current flow in winding 78 is such that the flux produced by this winding prior to the battery charging operation is such as to oppose the flux produced by the shunt winding 160 hence the armature 57 cannot be held magnetically in position shown in Fig. 1. However, this contact armature 57 is held in the position shown in Fig. 1 from the time the crank 112 arrives in the position shown in Fig. 1 until just after 180° of further rotation of the shaft 105. As explained before, the shaft 105 makes preferably one R. P. M. hence it will take 30 seconds for the crank 112 to move 180° from the position shown in Fig. 1, and therefore the starting circuit will be made for this length of time. Normally 30 seconds is sufficient for the engine to become self-operative and to have attained a generating speed. If the dynamo 24 functions as a generator before the 30 seconds starting period is up, the dynamo will operate as a differential compound generator to charge the battery. As the crank 112 moves from the horizontal or below the axis of shaft 105 and approaches the position shown in Fig. 2, the contact 52 will be moving into engagement with the contact 51. However, the contact armature 57 will not move downwardly with the contact 52 because during the generating operation the relay windings 78 and 160 operate cumulatively and maintain the contact armature 57 in position as shown in Fig. 1. The movement of the crank 112 to the position shown in Fig. 2 causes the contact 52 to engage the contact 51 and the contact 62 to engage the contacts 63 and 61. The dynamo 24 will now operate as a simple shunt field machine to supply the motor 65 in the power circuit 64 through the following circuit: armature of dynamo 24, brush 25, wire 50, contact 51, contact 52, pivot 53, wire 54, contacts 55, 57, 58, wire 60, contacts 61, 62, 63, power line 64, motor switch 66, motor 65, power line 70, magnet coil 71, wire 72, to generator brush 26. The contact 52 acts as a member to short circuit the series field 28. It is to be noted that not until the crank 112 has arrived at the position shown in Fig. 2 will the circuit to the power devices be made. Therefore it is apparent that the engine may be cranked for as long as 30 seconds, and thereafter the engine may be self-operative for at least 7½ seconds before the dynamo is connected to supply current (to the power line) in order to provide ample time to attain a generating speed sufficient to supply the demands of the power devices.

While the dynamo 24 is thus supplying current to the power line 64, 70 leading to one of the motors 65, the battery 30 is also being charged through the following circuit: armature of dynamo 24 to brush 25, wire 50, contact 51, contact 52, wire 54, contacts 55, 57, and 79, relay magnet windings 78, wire 77, battery 30, ampere hour meter 81, wire 82, wire 72, dynamo brush 26.

After the crank 112 has arrived at the position shown in Fig. 2, the controller motor 100 will stop because contact 107 has moved out of engagement with the contact 117 thereby breaking the connection between the battery and the motor 100. Motor 100 cannot be started again until the armature 132 falls down into engagement with contact 135. This will happen when the power line 64, 70 is interrupted, as by opening the switch 66 which is shown closed in Fig. 1, whereupon current will cease to flow to coils 71 and 130. When this happens the armature 132 will return to engagement with contact 135 and the control mechanism will be again operated because the following motor circuit will be established: battery line 77, wire 151, wire 150, pivot 131, armature 132, contact 135, contacts 116, 106, and 115, motor 100, to load circuit wire 72. Motor 100 will again rotate in the direction of arrow 114 and will bring the parts carried by shaft 105 to the home position shown in Fig. 3. The motor 100 will then stop because the contact 106 has moved away from the contact 115. The return of shaft 105 to home position causes another set of contacts for making circuit to motor 100 to be closed, namely, the contacts 117, 118 which are bridged by contact 107. The circuit to motor 100 is now set up so that if the armature 132 be moved magnetically into engagement with contact 134 the motor 100 will repeat its cycle of operations. During the movement of shaft 105 from the position shown in Fig. 2 to home position the ignition circuit will be opened since contact 109 is moved out of engagement with contacts 121 and 122. Thereupon the engine will stop and the dynamo 24 will cease to generate current for the battery. Thereupon the battery will discharge through the relay winding 78 causing magnetism to be set up to oppose the magnetism produced by the winding 160, thereby causing the armature conductor 57 to be released and the battery charging circuit to be broken.

The stopping of the plant in the manner described will take place provided the battery is not in such a state of discharge that the contact 91 and 93 have not been closed by the operation of the hand 83. However, if these contacts have been closed as shown in Fig. 1 then the plant will not stop automatically upon the interruption of the power circuit. The closing of contacts 91 and 93 causes the magnet winding 133 to be energized through the following circuit: battery 30, wire 77, wires 151 and 150, magnet winding 133, contacts 93, 91, wire 82, ampere hour meter 81 to battery 30. If these contacts 91 and 93 should become closed when the crank 112 is at the position shown in Fig. 2 then the armature 132 will remain in the position shown in Fig. 1 although the circuit is broken to the windings 71 and 130. The plant will continue to operate to charge the battery until the hand 83 of the ampere hour meter moves clockwise into engagement with the stud 89 and has pushed the stud far enough so that the upper notch 88 of the plate 85 (as viewed in Fig. 1) has become engaged by the spring pawl 87, whereupon the contact 91 will be moved out of engagement with contact 93. Then the circuit to winding 133 will be broken and the armature 132 will return to engagement with contact 135, whereupon the motor 100 will turn the shaft 105 from the position shown in Fig. 2 to home position shown in Fig. 3, and then the motor 100 will stop as already explained.

Another way in which the plant can be automatically started is by using more than a certain amount of current in the lighting circuit 70, 76. If it is desired to limit the battery discharge to 300 watts, for example, then if one consumes more than 300 watts in the circuit the winding 71 will be energized sufficiently to affect the attraction of armature 132 to start the plant. For example, if 30 watt lamps are used in the lighting circuit, then one may turn on at one time ten of these lamps and the plant will not operate, current being supplied to these lamps from the battery. However, if eleven lamps be turned on at one time, which dissipate more than 300 watts, then winding 71 will receive sufficient current to produce the attraction of armature 132. If some of these eleven lamps are turned off then the plant will stop automatically since the ampere turns in winding 71 will not be sufficient to hold up the armature 132.

It is to be noted that whatever devices are included in the lighting circuit at the time the plant is started automatically by the excess demand in this circuit, current must be supplied by the battery to these devices and to the dynamo to operate it as a motor to crank the engine. Now the current consumed by the lighting circuit should not be too great otherwise, there would not be enough current available for starting purposes. Therefore it is desirable to place in the lighting circuit only such devices as individually consume a small quantity of current. Therefore when a sufficient number of these devices have been turned on at the same time the current in the lighting circuit will only be slightly in excess of the current demand which causes the automatic starting of the plant.

For example, such devices as ½ H. P. motors requiring 600 watts and electric flat irons requiring 500 watts each, are placed in a separate circuit called the power circuit. The turning on of any one of these devices in the power circuit will cause the plant to become operative. But the power device gets no current sufficient to operate it until the engine has become self-operative and the generator is charging the battery. Battery current is therefore reserved for engine starting. Therefore, it is apparent that the demand on the storage battery during the starting of the plant is much less than would result from putting such power devices as have been mentioned in the lighting circuit.

It is apparent that the existence of any one of the following conditions will cause the plant to start automatically: first, when the power circuit is completed by the turning on of any power device in that circuit; second, by the demand for current in the lighting circuit in excess of a certain amount; and third, when the state of charge of the battery has reached a predetermined low state. Consequently the plant will automatically stop when the power circuit is interrupted, when the demand for current in the lighting circuit is materially reduced and when the battery has received a certain quantity of charging current. By means of a system of power generation such as referred to the turning on of any device in the power circuit will cause the plant to start automatically and to cause it to come up to generating speed before a power line is connected up with the generator to receive current therefrom. As already explained this procedure prevents an excessive drain on the storage battery and allows the use of a moderately small ampere-hour storage battery, since the battery need be only large enough to supply the demands of the starting motor and whatever may be the additional demand in the lighting circuit for causing the plant to operate. By virtue of this system a certain number of devices may be turned on in the lighting circuit without causing the plant to start. The capacity of the lighting circuit is usually made such that an ordinary number of electric lamps could be turned on at one time without the requiring of the operation of the engine. Therefore the number of starting operations has been minimized and current from the storage battery thereby conserved.

It is to be noted that the engine will start automatically irrespective of the state of battery charge, and should the plant be operative and the predetermined state of discharge of the battery be reached before the plant is stopped by the turning off of electrical translation devices, the plant will continue to operate until after the battery has received a certain quantity of charge. This insures the battery being kept in such a condition of charge that the plant will start automatically. Also if the plant has been started automatically through the operation of the ampere hour meter the turning on of any of the electrical translation devices will not cause the battery charging to be discontinued, and battery charging will continue after these devices have been turned off, provided the predetermined state of battery charge has not yet been attained.

It is to be noted also that if a power device is turned on while the battery is being charged by the generator and the predetermined state of battery charge has been attained before the power device is turned off the plant will keep on providing current to the power line. The same will be true in case of an excess demand on the lighting circuit.

The great convenience of the present invention is quite obvious since the operation of the plant can be controlled at a distance. One has but to turn on the switch usually located upon or immediately adjacent to the electric motor or lamp and the plant will be started according to the requirements of the demand as specified. The user is relieved of the necessity of first starting the plant by the operation of a starting switch located upon or near the plant before the power device can be turned on. One example of the great convenience of the present invention is given by referring to the use of the automatic plant upon a farm. The lighting circuit is preferably installed in the dwelling house and barn for lighting these buildings, while the larger power devices for operating farm machinery are located on the separate power line running through the barn and other sheds. If the farmer desires to operate one of the farm machines after dark he may be sure of having sufficient current for lighting purposes to enable him to find his way to the machine without having to wait for the lighting current to become available. In just a few seconds after turning on the power device there will be available sufficient current to operate it.

The advantage of limiting the demand of the work circuits to a fraction of the battery output during and prior to engine starting so as to maintain a reserve sufficient for cranking the engine has been pointed out and the fact that the power circuit does not receive sufficient current to operate any power device connected to it has also been mentioned. The last mentioned characteristic is due to the fact that the winding 130 is in series with the power circuit during engine starting and as already stated, it is composed of a relatively large number of turns of fine wire. While the amount of current passing through the winding 130 is sufficient to cause the attraction of armature 132, it is of negligible value for doing any useful work in the power circuit. In fact the amount of current is such a minute fraction of an ampere that its presence would not be detected with an ordinary translating device such as a lamp in the power circuit and hence for all practical purposes it may be said that all current is withheld from the power circuit until the engine and generator are fully operative, as already explained.

To insure that the battery does not reach such a state of discharge that a simultaneous maximum demand of say 300 watts by the light circuit and a demand by the dynamo for engine cranking, will not leave the dynamo with insufficient current for cranking, the ampere hour meter may be so arranged so that the contacts 91 and 93 will close for the purpose of starting the engine before the battery is actually discharged. In other words, the so-called point or state of discharge at which the ampere hour meter functions to recharge the battery need not correspond to the actual state of discharge of the battery. Such an arrangement provides a factor of safety in the state of battery charge sufficient to insure engine cranking under the most adverse conditions.

In order to assist in starting the engine, and especially when medium grade fuels such as kerosene are used, the heating coil 37 is connected up to the battery through the following circuit which exists from an instant just following the movement of crank 112 from home position shown in Fig. 3 until just before the crank arrives at the position shown in Fig. 2, so that the heating of the engine intake continues substantially during the entire cranking period. The heater circuit includes battery 30, wire 77, wire 151, contacts 124, 110, and 123, wire 170, coil 37, wire 171, wire 72, wire 82, ampere hour meter 81 to battery 30.

Means are provided for indicating whether the engine has a sufficient supply of lubricating oil and this means is operative substantially during the entire cycle of operations of motor 100, and consequently the last of lubricating oil will be called to the attention of the user any time during the starting of the plant or while it is generating. This alarm circuit is as follows: battery 30, wire 77, wire 151, alarm bell 172, contacts 126, 111, and 125, wire 174, contacts 43, 42, and 44, wires 173, 171, wire 72, wire 82, ampere hour meter 81, back to battery 30. As explained before, contacts 42, 43, and 44 will be connected when the level of oil 39 falls below a certain amount.

The alarm 172 will sound for an instant at the start of the cycle of operations of the motor 100. Just after the contact 110 has moved far enough from its position shown in Fig. 3 to connect contacts 125, 126 and before the crank 112 has moved far enough to move contact 57 away from contact 143 the following alarm circuit will be established: battery 30, wire 77, wire 151, alarm 172, contacts 126, 111, and 125, wire 174, wire 175, contact 57, contact 143, wire 162, wire 82, ampere hour meter 81, back to battery 30. This signal is useful in indicating that the controller motor 100 has begun its cycle of operations and that in a normal course of events current for the power line or for the excess demand in the lighting circuit will be available.

This alarm will sound again if the engine should not become self-operative during the remainder of the cycle of operations of the motor 100. If the plant does not become self-operative naturally no current will be generated and the conditions of magnetism produced by the windings 78 and 160 will not be such as to cause the armature contact 57 to be held in attracted position as shown in Fig. 1. Therefore, as the crank 112 descends to the position shown in Fig. 2 the contact 57 will descend with the contact 52 and will finally engage the contact 143 by the time the crank has arrived at the position shown in Fig. 2. The motor 100 will stop but the alarm will continue to ring until the power line is opened or the demand for current in the lighting circuit materially reduced whereupon the motor 100 will be started again on its way to home position shown in Fig. 3. This operation of the motor will interrupt the circuit between contacts 125, 126 to shut off the alarm. This second alarm is therefore useful to indicate that although the automatic controller has been functioning the engine has failed to start for some reason such as failure of the ignition system or lack of fuel, two of the most common causes of the failure of an internal-combustion engine to start. On hearing the second alarm which may be loud enough to be heard over the farm premises, for example, the operator can proceed to remedy the trouble.

While the form of mechanism herein shown and described constitutes a preferred embodiment of one form of the invention, it is to be understood that other forms might be adopted and various changes and alterations made in the shape, size, and proportion of the elements therein without departing from the spirit and scope of the invention.

What is claimed is as follows:

1. In an electrical generating system, the combination with a prime mover and a dynamo adapted to be driven thereby; of a circuit containing a translating device adapted to be energized by said dynamo; of a second circuit containing a translating device; of a battery adapted to operate the translating device in said second circuit; of means for causing the prime mover to drive said dynamo; and means common to both circuits and responsive to a demand in said first circuit or to an excess demand in said second circuit for rendering the first means operable, said second named means having provisions for limiting the current flow from the battery to the translating device in the first circuit below a value sufficient to operate said device.

2. In an electrical generating system, the combination with an internal combustion engine and a dynamo adapted to be driven thereby; a work circuit containing a translating device adapted to be operated by the dynamo; a battery; a second work circuit containing a translating device adapted to be operated by current from the battery or by current from the dynamo; means for causing the internal combustion engine to drive the dynamo to supply current to said devices; a circuit connecting said first work circuit with the battery and energized upon demand in said work circuit; and control mechanism associated with the connecting circuit for controlling said means and for limiting the flow of current from the battery to the first work circuit to a value insufficient to operate said device in said work circuit.

3. In an electrical generating system, the combination with an internal combustion engine and a dynamo adapted to be driven thereby; a work circuit containing a translating device adapted to receive operating current only when the dynamo is generating current; a battery; a second work circuit containing a translating device adapted to be operated by current from the battery or by current from the dynamo when the dynamo is generating current; means for causing the internal combustion engine to drive the dynamo to supply current to said devices; a circuit connecting said second work circuit with the battery and energized upon demand in said second work circuit; and control mechanism associated with the connecting circuit for controlling the first means when there is an excess demand in the second work circuit and for limiting the current flow from the battery to the first work circuit below a value sufficient to operate the device in said first work circuit.

4. In an electrical generating system, the combination with an internal combustion engine and a dynamo adapted to be driven thereby; a work circuit containing a translating device; a battery; a second work circuit containing a translating device adapted to be operated by current from the battery or by current from the dynamo; a device for causing the internal combustion engine to drive the dynamo to supply current to said devices; a circuit connecting the first work circuit with the battery; a circuit connecting the second work circuit with the battery; and control mechanism including means associated with the first connecting circuit for controlling said device when there is a demand in the first work circuit and for limiting the flow of current from the battery to the first work circuit below a value sufficient to operate the device in said first work circuit, said control mechanism including means associated with the second connecting circuit for controlling said device when there is an excess demand in the second work circuit.

5. In an electrical generating system, the combination with an internal combustion engine, and a dynamo adapted to be driven thereby; a work circuit containing a translating device adapted to be operated by said dynamo; a battery; a second work circuit containing a translating device adapted to be operated by current from the battery or by current from the dynamo; a device for causing the internal combustion engine to drive the dynamo to supply current to said devices; a circuit connecting the first work circuit with the battery; a circuit connecting the second work circuit with the battery; and control mechanism including means associated with the first connecting circuit for controlling said device when there is a demand in the first work circuit, and for limiting the flow of current from the battery to the first work circuit below a value sufficient to operate the device in said first work circuit, said control mechanism including means associated with the second connecting circuit for controlling said device when there is an excess demand in the second work circuit, said control mechanism being arranged to maintain the dynamo operative to supply current as long as there is a demand in either the first work circuit or an excess demand in the second work circuit.

6. In an electrical generating system, the combination with an internal combustion engine and a dynamo adapted to crank the engine and adapted to be driven thereby; of a work circuit containing a translating device adapted to receive operating current only when said dynamo is generating current; a battery; circuit connections between said battery and said dynamo and between said dynamo and work circuit; switch apparatus including means for controlling the circuit connections between the battery and said dynamo for causing the internal combustion engine to drive the dynamo, and means for controlling the circuit connections between the dynamo and the translating circuit; a controller adapted to actuate said first means and adapted to actuate said second means in a predetermined interval of time subsequent to the actuation of the first means; and control mechanism for the controller.

7. In an electrical generating system, the combination with an internal combustion engine and a dynamo adapted to crank the engine and adapted to be driven thereby; of a work circuit containing a translating device adapted to receive operating current only when said dynamo is generating current; a battery; circuit connections between said battery and said dynamo and between said dynamo and work circuit; switch apparatus including a contact for controlling the circuit connections between the battery and the dynamo, means for conditioning the circuit connections between the dynamo and work circuit, and a contact connecting the work circuit with the dynamo through said conditioning means; a controller adapted to actuate said first contact and adapted to actuate the second contact in a predetermined interval of time subsequent to the actuation of the first contact; and control mechanism for the controller.

8. In an electrical generating system, the combination with an internal combustion engine and a dynamo adapted to crank the engine and adapted to be driven thereby; of a work circuit containing a translating device adapted to receive operating current only when said dynamo is generating current; a battery; circuit connections between said battery and said dynamo and between said dynamo and work circuit; switch apparatus including a contact for controlling the circuit connections between the battery and dynamo, means for conditioning the circuit connections between the dynamo and work circuit and means responsive to the speed of the engine for controlling said conditioning means, and a contact for connecting the work circuit with the dynamo through said conditioning means; a controller adapted to actuate said first contact and adapted to actuate the second contact in a predetermined interval of time subsequent to the actuation of the first contact; and control mechanism for the controller.

9. In an electrical generating system, the combination with an internal combustion engine and a dynamo having a plurality of field circuits, said dynamo being capable of operation as a motor for cranking the engine or as generator with certain of the field circuits operative; a storage battery; a controller; a switch including means operated by said controller for connecting the dynamo with the battery for cranking the engine with certain of said field circuits operative, means operated independently of the controller and responsive to the speed of the engine for maintaining said first means in circuit closing position, and means operated by said controller in a predetermined time subsequent to the actuation of said first means for rendering certain of said fields ineffective; and controlling means for said controller.

10. An electrical generating system, the combination with the prime mover and a dynamo adapted to be driven thereby; of a work circuit containing a translating device adapted to receive operating current only when the dynamo is generating current; a storage battery adapted to be connected with the dynamo whereby to be charged by said dynamo; a circuit connecting the work circuit with the battery; means associated with said connecting circuit for limiting the flow of current from the battery to the work circuit to a value insufficient to operate the device in said work circuit; a switch responsive to the flow of current in said connecting circuit for connecting the dynamo with the battery; and control mechanism for connecting the dynamo with the work circuit including means responsive to the self-operation of the prime mover for maintaining said switch in the battery dynamo connecting position whereby to charge the battery.

11. In an electrical generating system the combination with a prime mover and a dynamo having a plurality of field circuits, said dynamo being capable of operation as a motor or as a generator; of a circuit adapted to receive current from said dynamo; a storage battery adapted to be connected in said circuit whereby to be charged by the dynamo; control mechanism responding to a demand for current from the dynamo for controlling the prime mover dynamo operation, said mechanism including a switch for connecting the dynamo with the battery and for so controlling said field circuits that the dynamo functions as a high torque motor for starting the prime mover, and means responding to the self-operation of the prime mover for maintaining said switch in said dynamo and battery connecting position whereby the dynamo may charge the battery and for conditioning said control mechanism to effect a change of said field circuits for generator operation.

12. An electrical current-supplying system, comprising a source of current, a work circuit adapted to contain a heavy-current translating device operating at substantially the voltage of said source of current and connected therewith, a second work circuit adapted to contain a small-current translating device operating at substantially the voltage of said source of current, said second work circuit being connected with said source of current to receive current therefrom as demanded by its said translating device, a second source of current of substantially the same voltage as the first source, means for placing said second source in electrical connection across the terminals of said first source, and means associated with said first work circuit and responsive to a demand therein for automatically controlling said first mentioned means and for withholding flow of current to said first work circuit in quantity sufficient to operate the translating device therein until said second source of current has been placed in electrical connection with said first source.

13. An electrical current-supplying system, comprising a source of current, a work circuit connected with said source and containing a translating device operating at substantially the voltage of said source, a second work circuit also connected with said source and containing a translating device operating at substantially the voltage of said source of current, a second source of current of substantially the same voltage as said first source, means for connecting said second source across the terminals of said first source to supplement the output of the latter, and means responsive to current demand in said second work circuit for electrically connecting said second source of current with said first source to supplement the latter, and for withholding operating current to the translating device of said first circuit in quantity sufficient to operate the same until said second source has been connected with said first source.

14. An electrical current supply system comprising a source of current, a work circuit connected with said source and containing a translating device operated at substantially the voltage of said source, a second source of current, a second work circuit containing a translating device operating at substantially the same voltage as said sources of current and adapted to be energized by either, means responsive to a current demand in said first work circuit for electrically connecting said second source of current with said first source to supplement the latter and for withholding operating current to said translating device of said first circuit in quantity sufficient to operate the same until said second source has been connected with said first source.

15. An electrical current-supplying system, comprising a source of current, a work circuit connected with said source and adapted to contain a translating device operating at substantially the voltage of said source, a second source of current of substantially the same voltage as said first source, means for connecting said second source across the terminals of said first source to supplement the output of the latter, and means for withholding operating current to the translating devices of said work circuit in quantity sufficient to operate the same until said second source has been connected with said first source.

16. In an electrical generating system, the combination with an internal combustion engine and a dynamo adapted to be driven thereby; a work circuit containing a translating device and adapted to be connected with said dynamo for operation at substantially the same voltage as that generated by said dynamo, a battery of substantially the same voltage as that generated by the dynamo; a second work circuit containing a translating device and adapted to operate at substantially the same voltage as that generated by the dynamo and to receive current from either the dynamo or the battery; a control circuit connected with said first work circuit and with said battery; said control circuit being of such character as to limit the flow of current from the battery to an amount insufficient to operate said translating device in the first work circuit, and means associated with said control circuit and responding to a current flow therein for causing the dynamo to be driven by the prime mover and for establishing operative current supplying connection between the dynamo and said first circuit only after the dynamo has attained proper generating speed.

In testimony whereof I hereunto affix my signature.

CHARLES F. KETTERING.